US009959339B2

(12) United States Patent
Ashton et al.

(10) Patent No.: US 9,959,339 B2
(45) Date of Patent: May 1, 2018

(54) JOURNEY TIME ESTIMATION (71) Applicant: International Business Machines Corporation, Armonk, NY (US)

(72) Inventors: Jean S. Ashton, Paris (FR); Thomas Baudel, Paris (FR); Sebastien Blandin, Singapore (SG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 14/797,202

(22) Filed: Jul. 13, 2015

(65) Prior Publication Data
US 2017/0016732 A1  Jan. 19, 2017

(51) Int. Cl.
*G01C 21/34* (2006.01)
*G06F 17/30* (2006.01)

(52) U.S. Cl.
CPC ..... *G06F 17/30625* (2013.01); *G01C 21/343* (2013.01); *G01C 21/3415* (2013.01)

(58) Field of Classification Search
USPC ........................................................ 701/410
See application file for complete search history.

(56) References Cited

U.S. PATENT DOCUMENTS

| | | | |
|---|---|---|---|
| 7,920,960 B2 | 4/2011 | Liu et al. | |
| 8,407,007 B2* | 3/2013 | Blias | G01V 1/42 367/27 |
| 8,510,315 B2* | 8/2013 | Zheng | G06Q 10/08 707/723 |
| 8,718,932 B1* | 5/2014 | Pack | G01C 21/30 701/446 |
| 2003/0069665 A1* | 4/2003 | Haag | E04H 6/422 700/217 |
| 2008/0033640 A1* | 2/2008 | Amano | G01C 21/3476 701/414 |
| 2009/0063045 A1* | 3/2009 | Figueroa | G01C 21/26 701/414 |

(Continued)

FOREIGN PATENT DOCUMENTS

EP  1934557 B1  7/2014

OTHER PUBLICATIONS

Yaser E. Hawas, "Simulation-Based Regression Models to Estimate Bus Routes and Network Travel Times", Journal of Public Transportation, vol. 16, No. 4, 2013; 24 pages.

*Primary Examiner* — Jean Paul Cass
(74) *Attorney, Agent, or Firm* — Cantor Colburn LLP (57) ABSTRACT

Embodiments relate to calculating a journey time for a planned journey between a chosen origin and a chosen destination over a network of roads in a region. A first journey time for the journey is estimated using a route scheduling algorithm and a second journey time for the journey is estimated using selected historical journeys characterized by journey origins and destinations. The historical journeys are selected based on their vicinity to the planned journey. An error in the second journey time is calculated based on the standard deviation in the selected historical journeys. The second journey time is selected as the estimated journey time from the planned journey if this error is below a defined threshold, otherwise the first journey time is selected as the estimated journey time for the planned journey.

19 Claims, 4 Drawing Sheets

(56) References Cited

U.S. PATENT DOCUMENTS

| | | | |
|---|---|---|---|
| 2009/0112458 A1* | 4/2009 | Nakai | G01C 21/3415 701/533 |
| 2011/0029281 A1* | 2/2011 | Tsukamoto | G01C 21/3492 702/176 |
| 2011/0099171 A1* | 4/2011 | Van Buer | G01C 21/32 707/737 |
| 2013/0262349 A1* | 10/2013 | Bouqata | G06N 99/005 706/12 |
| 2014/0114556 A1 | 4/2014 | Pan et al. | |
| 2015/0226563 A1* | 8/2015 | Cox | G07C 5/00 701/29.1 |
| 2015/0228129 A1* | 8/2015 | Cox | G07C 5/0808 701/29.1 |
| 2015/0268056 A1* | 9/2015 | Gueziec | G01C 21/3492 701/117 |
| 2017/0011324 A1* | 1/2017 | Truong | G06Q 10/06311 |

* cited by examiner

JOURNEY TIME ESTIMATION

BACKGROUND

The present disclosure relates to journey time estimation and, more specifically, to estimating a journey time for a journey between a chosen origin and a chosen destination.

Travel by road using vehicles is an integral part of modern society and an integral factor in economic performance. For example, many commuters use road networks to travel to their place of work, logistics include delivery of goods to intended destinations by road, and so on. This puts a strain on the road networks, as traffic volumes can exceed the capacity of the road networks, leading to congestion and delays.

This is particularly prevalent is urban areas, where the capacity of the road network typically is constrained, either permanently by the size of the roads, or temporarily by roadwork, accidents and so on. Such congestion may not be permanently present, but may instead occur during certain periods of time in which high levels of traffic utilize the road network, e.g. weekday rush hours or business hours.

It is therefore desirable to be able to predict journey times over road networks such that congestion can be avoided. This is desirable for a number of reasons. For example, a hauling company wishing to minimize delays during the delivery of a number of items at one or more destinations in a certain region may wish to plan a round trip from its depot that minimizes the overall journey time of the round trip, e.g. to minimize costs of the round trip to protect profit margins, whereas (local) authorities may wish to minimize congestion on their road networks to avoid needless $CO_2$ emissions in order to more effectively reduce the emission of greenhouse gases.

SUMMARY

According to an embodiment, a method, system, and computer program product for calculating a journey time for a journey between a chosen origin and a chosen destination over a network of roads in a region including the chosen origin and chosen destination. The method includes planning a route for the journey using a route planning algorithm, the planning including calculating a first journey time for the route. A database of entries of historical journeys in the region is provided. Each journey entry in the database includes a journey origin, a journey destination and an actual journey time. A set of historical journeys from the database is selected. The selected historical journeys have a historical origin and historical destination that are nearest neighbors to the chosen origin and the chosen destination of the journey. A second journey time is calculated for the journey from the selected set of historical journeys. An error for the second journey time is estimated based on calculating a standard deviation for calculated journey times of the historical journeys in the set, where the journey time of each of the historical journeys in the set is calculated from the actual journey times of the other historical journeys in the set. The second journey time for the journey is selected if the estimated error is below a defined threshold otherwise, the first journey time is selected. A signal that includes the selected journey time for the journey is generated.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention include a method, computer program product and system for estimating a journey time for a journey between a chosen origin and a chosen destination using historical data that is not linked to specific road segments.

It has been found that by using an origin-destination based historical model where the actual routes taken for the historical journeys are unknown, the actual journey times obtained for the historical journeys can still provide an accurate estimate of a journey time for a planned journey between a chosen origin and a chosen destination when the historical database includes nearest neighbors to the planned journey that are sufficiently close thereto such that the estimated journey time derived from the actual historical journey times of these nearest neighbor historical journeys exhibits a small enough error. In such a scenario, it has been found that the second journey time for the planned journey statistically is more accurate that the first journey time for the planed journey as derived from the static model, i.e. the route planning algorithm, in which case the selection of the second journey time as the predicted journey time for the planned journey on average gives a more accurate prediction of the journey time for a pool of journeys of which the journey times are predicted in accordance with the method compared to journey times predicted using the static model only. In other words, it has been found that the actual route taken to travel from an origin to a destination is of limited relevance, such that a relatively simple historical model may be used to obtain accurate predictions of journey times for planned journeys.

In an embodiment, selecting a set of historical journeys from the database can include selecting a predefined number of nearest neighbors to the planned journey from the database. This embodiment is based on the insight that once a minimum number of nearest neighbors is included in the estimation of the second journey time, the accuracy of the estimation does not further improve by the inclusion of more nearest neighbors. This therefore ensures that the efficiency of embodiments is optimized by minimizing the number of nearest neighbors that need to be considered in the estimation of the second journey time.

Calculating the second journey time for the journey from the selected set of historical journeys can include calculating the average of the actual journey times of the selected nearest neighbors. This can give an accurate estimate of the second journey time as the nearest neighbors typically include historical journeys that are shorter than the planned journey as well as historical journeys that are longer than the planned journey, such that the averaged actual journey times of the historical journeys is a fair estimate of the journey time of the planned journey. This for instance may obviate the need to calculate distances between the historical origins and destinations of the nearest neighbors and the chosen origin and destination for the purpose of correction of the individual historical journey times using the calculated differences.

The optimal number of nearest neighbors may be selected experimentally by predicting an error in the second journey time based on a selection of N nearest neighbors with N being an integer greater than 1 and varying N to find the number of nearest neighbors at which the error is minimized. This optimization may be performed in a preprocessing of the database prior to journey time estimation or may be performed periodically to verify if a previously determined optimal number of nearest neighbors is still valid, e.g. following changes to the database such as database entry additions and/or deletions.

The predicted minimized error may be used as the predefined threshold. A standard deviation may be added to the predicted minimized error when defining the threshold to add tolerance to the second journey time estimation method.

Estimating an error for the second journey time based on calculating a standard deviation for calculated journey times of the historical journeys in the set can include dividing the calculated standard deviation by a mean journey time for the historical journeys in the set. This can be advantageous where journey times of journeys of substantially different lengths may need to be estimated, such that the absolute value of the standard deviation alone may not be sufficiently representative of the error in the second journey time, and a better representation may be obtained by dividing the standard deviation by the mean journey time of the selected historical journeys.

In an embodiment, each database entry can further include an actual time of day when the historical journey was made, and where calculating the standard deviation for calculated journey times of the historical journeys in the set includes providing an estimated time of day for the journey and weighting the selected historical journeys in the calculation in accordance with a difference between the estimated time of day for the journey and the actual journey time of the selected historical journey. This facilitates the provision of an estimated journey time at a given time of day with improved accuracy as the influence of the time of day on the historical journey times is factored into the estimation of the second journey time.

The database can be categorized in one or more categories corresponding to vehicle types having made the historical journeys and selecting a set of historical journeys from the database can include selecting historical journeys from a category corresponding to a particular vehicle type. This can further improve the accuracy of the estimated journey time, as the journey time may be a function of the vehicle type, such that for a given vehicle type, e.g. a lorry, only historical journeys made by the same vehicle type are considered when calculating the second journey time.

Embodiments can also include receiving journey information of a journey made in the region, the journey information including, for example, a journey origin, a journey destination and an actual journey time; and updating the database with the received journey information. Such database updates expand the number of historical journeys in the database, thus improving the accuracy of future journey times calculated using the expanded database due to the fact that the standard deviation in the second journey time is reduced by virtue of the database comprising nearest neighbors that are nearer to the planned journey.

The accuracy of the database may be further improved by filtering the database by calculating a possible route for a historical journey; calculating an average speed over the possible route based on the actual journey time; and removing historical journeys from the database that have a calculated average speed outside a defined average speed range. In this manner, erroneous data can be removed from the database.

The route planning algorithm may include a graph representation of the network of roads including graph edges corresponding to road segments and graph nodes interconnecting graph edges, where each graph edge comprises a set of parameters from which a partial journey time over the road segment can be estimated and where calculating the first journey time for the route comprises calculating the partial journey times for the road segments defining the planned route and summing the calculated partial journey times.

Embodiments can also include scheduling a round trip from an origin over a network of roads in a region including the origin. A plurality of chosen destinations in the region are received. A travelling salesman algorithm is applied to a set of data points including the origin and the plurality of chosen destinations to schedule the round trip. The travelling salesman algorithm calculates journey times between respective pairs of data points in the set (e.g., as described previously). It has been found that by implementing the journey time estimation method of embodiments of the present invention into such travelling salesman algorithms, a round trip with improved predicted trip time accuracy is obtained.

Applying the travelling salesman algorithm can include calculating a plurality of routes between respective data points using the route planning algorithm, the plurality of routes defining the round trip. The route information may be used to guide the driver of a vehicle through the region. In an embodiment, traffic congestion information is received for roads in the network, where calculating the plurality of routes between respective data points using the route planning algorithm includes avoiding roads for which traffic congestion information has been received. This therefore can reduce the risk that the driver of a vehicle making the round trip gets stuck in traffic.

Embodiments can further include a communication module for communicating with a remote device, the communication module including an input device and an output device. Such a communication module can facilitate remote access of the computer system, e.g. network access over a wired or wireless network. For example, the computer system may host a journey time estimation service accessible by client devices connecting to the service. In an embodiment, the input device is adapted to receive a plurality of chosen destinations in the region and the output device is adapted to generate a signal comprising the scheduled round trip.

Contemporary approaches to generating journey times include using a simulation-oriented approach in which static models are applied to predict the journey time. Such a static model may utilize a graph representation of the network of roads including graph edges corresponding to road segments and graph nodes interconnecting graph edges, where each graph edge comprises a set of parameters from which a partial journey time over the road segment can be estimated such that a journey time can be estimated by calculating the partial journey times for the road segments defining the planned route and summing the calculated partial journey times. Satellite navigation systems for instance may use such an approach.

A problem with such simulation-oriented approaches is that they can be prone to estimation errors in the estimated journey time. For example, the actual speeds on the road segments may deviate significantly from the parameterized speed used in the static model, e.g. through traffic conditions on the road segments. This problem is typically compounded when trying to schedule a trip that includes a plurality of journeys in the region, as the estimation errors for each estimated journey time tend to accumulate rather than cancel each other out, thus potentially leading to highly inaccurate estimated trip times.

A further complication can be that such problems in estimation only occur at certain times of day, e.g. during rush hour or business hours. This can be factored into the simulation-oriented approaches by including real-time data indicative of actual traffic conditions on road segments to predict traffic conditions on the road segments at certain points in time, e.g. during certain parts of the day, and augmenting the simulation-oriented approach accordingly. Such real-time data for instance may be collected using fixed sensors or GPS data collected from road users.

However, the data from fixed sensors can be difficult to correlate with travel time due to the fluctuating nature of traffic conditions. Also, it is practically unfeasible to fit fixed sensors to each road segment of the entire road network, and thus, large fractions of road segments remain unmonitored. The use of GPS data is also not without problems as it can require a high sampling rate of the data to obtain accurate data, which may be unfeasible. It furthermore requires road users that can provide such GPS data, which cannot be guaranteed.

Embodiments described herein improve the accuracy of journey time predictions by using both real-time and historical information.

It should be understood that the Figures are merely schematic and are not drawn to scale. It should also be understood that the same reference numerals are used throughout the Figures to indicate the same or similar parts.

At least some embodiments of the present invention are particularly applicable to providing journey time estimates in regions experiencing time-dependent fluctuations in traffic density on the network of roads in the region, such as an urban region, which regions are particularly prone to journey time prediction errors due to these fluctuations. At least some embodiments of the present invention are particularly applicable to providing journey time estimates for professional journeys such as goods deliveries, professional visits and so on, to one or more locations within such an urban region, as the executors of professional journeys may particularly suffer economically from inaccurate journey time predictions, e.g. longer journey times causing additional expenditure in terms of fuel and/or salary cost and loss of profit as a result. At least some embodiments of the present invention are particularly applicable to providing journey time estimates for professional journeys made with a particular type of vehicle having a typical travel speed through the urban region, such as lorries or other goods-transporting vehicles, which due to their size are particularly affected by fluctuations in the traffic densities on the network of roads in the urban region. It should however be understood that the present invention is not limited to these embodiments; the present invention may be applied to the prediction of journey times of any type of vehicle in any type of region.

According to an embodiment of the present invention, there is provided a database comprising historical journeys made over the network of roads in a region of interest, such as for example an urban region, wherein each database entry at least comprises an actual origin and destination of the historical journey as well as the actual journey time of the historical journey. Such historical journey information may be collected in any suitable manner. For example, drivers of vehicles making journeys over the network of roads in a region of interest may log the journey with the database, for instance by capturing the actual origin and destination of the journey as well as capturing the actual journey time of the journey, and logging the captured data in the database.

The data may be captured in any suitable manner; for example, the driver may capture origin location information using a device capable of capturing location information, e.g. a device incorporating a positioning determination module such as a GPS module or a module for determining a position by triangulation of signals other than satellite signals, e.g. signals from different base stations of a mobile communications network in the region of interest. Examples of suitable device may include satellite navigation systems, mobile communication devices such as mobile telephones, and so on. The driver may capture the data by manually entering at least some of the data into the device or by activating the device to automatically capture the necessary data, e.g. by providing the device with a command indicating the start and end of the journey respectively, with the device calculating the actual journey time based on the time elapsed between the start and end commands.

The data may be uploaded into the database in any suitable manner; for example, the device incorporating the positioning determination module may comprise a wireless communication module for wirelessly communicating with a computer system hosting the database over a wireless network using any suitable wireless communication standard, e.g. a mobile publication standard such as 3G, 4G or 5G, a wireless Internet protocol, and so on. Alternatively, the device may comprise a network communication module for communicating with the computer system hosting a database over a wired network using any suitable communication protocol, e.g. over the Internet. The device may transmit the captured journey data in real-time, at defined points in time, in response to a user instruction, and so on.

It should be understood that the above examples of data capturing of historical journey data is entirely non-limiting and that the skilled person will have no difficulty providing many suitable alternatives to these examples, which suitable alternatives are also contemplated to fall under the teachings of the present application.

In an embodiment, the historical journey data may further comprise a time stamp, e.g. including time and optionally date of the journey. The recorded time of the journey may be the start time of the journey, the completion time of the journey or any point in time between the start time and completion time of the journey. As will be explained in further detail below, the time stamp information associated with such a database entry may be utilized to further improve the accuracy of a journey time between a chosen origin and destination estimated based on the historical journey data in the database.

In an embodiment, that historical journey data may further comprise an indication of the type of vehicle used to make the historical journey. To this end, the database may comprise one or more vehicle categories, for instance motorbike, car, van, lorry, articulated lorry or any subset thereof. As will be explained in further detail below, the vehicle type information associated with such a database entry may be utilized to further improve the accuracy of a journey time between a chosen origin and destination estimated based on the historical journey data in the database. In an embodiment, the database contains only database entries associated with a particular type of vehicle, such as a goods transporting vehicle such as a van, lorry or articulated lorry.

Other possible known attributes of the historical journey that may also be recorded in the historical database may be used, for instance to select the appropriate nearest neighbors or to perform a weighing of an estimated journey time based on the attributes of the selected nearest neighbors. Non-limiting examples of such attributes include experience of the driver (e.g. from expert to novice), type of cargo (letters/parcels vs heavy load), the presence or absence of delivery constraints (deliver before or after a certain time), and so on.

The database may be continuously updated, e.g. by adding new journeys to the database in order to expand the dataset comprised by the database. This may be achieved by drivers of vehicles providing database entry information when making journeys over the network of roads of the region using their devices as previously explained.

In order to increase the quality of the historical journey data in the database, the historical journey data may be filtered such that statistical outliers are removed from the database. Any suitable filter criteria may be applied. A particularly suitable filter criterion is average speed for the historical journey. At this point, it is reiterated that the database entries do not comprise route information such that an estimate of the distance covered between the recorded origin and destination of the historical journey needs to be produced. A straightforward approach would be to calculate the distance between the origin and destination (as the crow flies) but this may give a realistic estimate of the average speed of the journey as the actual distance covered will be larger when performing the journey over a network of roads.

In an embodiment, the distance covered during the historical journey may be estimated by the provision of a graph representation of the network of roads, by calculating a plausible route, e.g. the shortest route in time or distance, between the origin and destination of the historical journey and by calculating the length of the calculated plausible route such that the average speed of the historical journey can be calculated by dividing the length of the calculated plausible route by the recorded journey time of the historical route. Algorithms for calculating such a plausible route are well-known; one such algorithm is Dijkstra's algorithm which is commonly used to find the shortest paths between nodes in a graph, which may represent, for example, road networks. The skilled person will be aware of many other known suitable algorithms for calculating such a plausible route, which known algorithms may be used instead.

In filtering the database, database entries for which an average speed is calculated outside a defined range of average speeds, may be removed from the database. The lower and upper endpoints of the defined range of average speeds may be chosen in accordance with the typical spread of road conditions on the network of roads of the region of interest. For example, a lower limit of the range may be defined about 2-3 km/h (about half the typical walking speed through the region) whereas the upper limit of the range may be defined about 70 km/h, e.g. about the average speed limit. Other suitable values may of course be contemplated. Further filter criteria may include a defined range of average speeds for a particular time of day and/or a defined range of average speeds for a particular type of vehicle where the database entries include such additional information as previously explained.

The database filtering may be performed at any suitable point in time, such as every time a new entry is submitted to the database, where the new entry may be rejected if its average speed falls outside the appropriate average speed range, or periodically, e.g. at set times.

In an embodiment, each historical origin and a historical destination is represented by a pair of geographic coordinates in the database. This allows for the database to be structured as a 4-dimensional tree structure in which each dimension corresponds to one of the geographic coordinates. This is a particular suitable structure for easily finding database entries of historical journeys that are closest related to a planned journey for which a journey time is to be estimated using selected database entries. Such closest related historical journeys will also be referred to as nearest neighbors of the planned journey.

Figure 1:
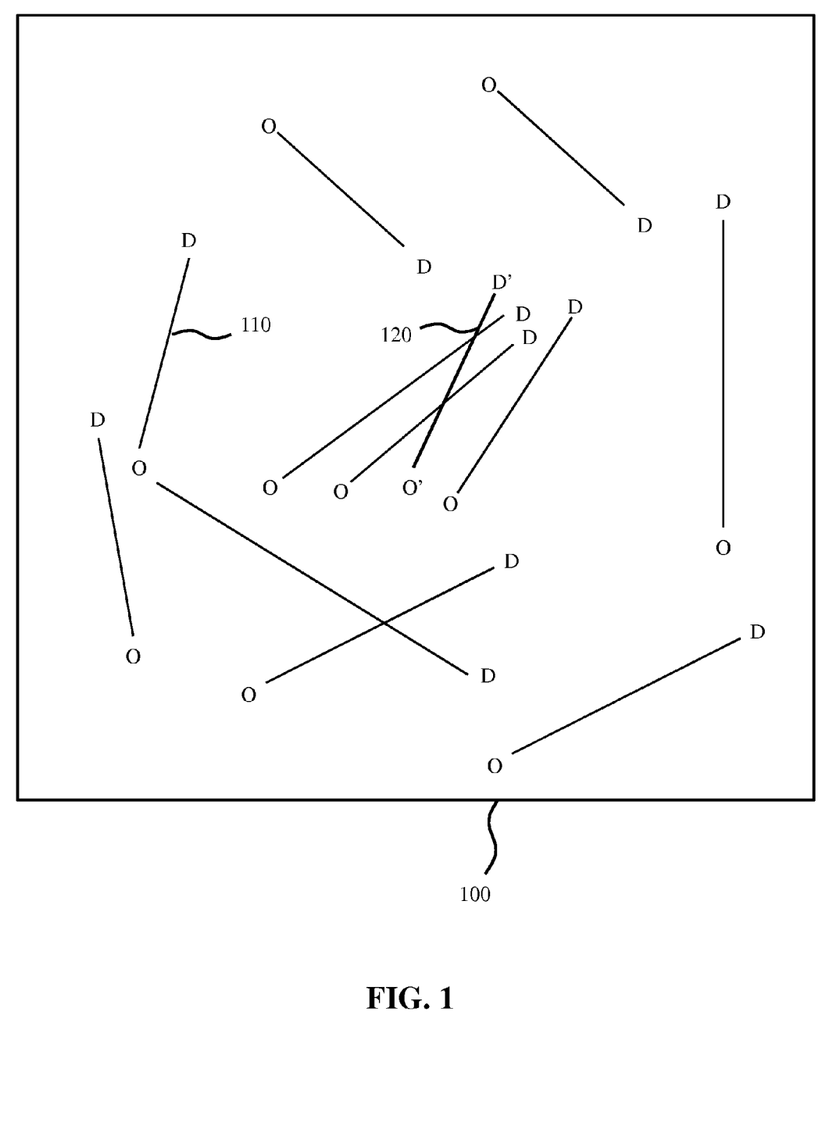
FIG. 1 schematically depicts a map of a region and a plurality of historical journeys between various origins and destinations on the map.

This will be explained in more detail with the aid of FIG. 1, which schematically depicts a map of a region 100 and a plurality of historical journeys 110 between various origins and destinations on the map (each labeled O and D respectively). Note that the map intentionally does show the network of roads in the region 100 as no route information, i.e. roads taken between the origin and destination of a historical data) needs to be used in calculating an estimated journey time for the planned journey. Journey 120 is the planned journey between a chosen origin O' and a chosen destination D' for which a journey time is to be estimated using selected historical journey entries in the database. It should be understood that FIG. 1 shows a small subset of all database entries of the database, which typically comprises hundreds or thousands of historical journeys made in the region 100.

The nearest neighbors for journey 120 may be found by searching the database and identifying those historical journeys 110 that have a defined distance from the journey 120, such as all historical journeys 110 having a distance to the journey 120 below a defined threshold or the N historical journeys having the smallest distance to the journey 120, in which N is a positive integer having a value of at least 2, in an embodiment at least 5, such as 5, 6, 7, 8, 9 or 10. It is noted that increasing N beyond an optimal value causes a deterioration of the accuracy of the estimated journey time for the planned journey 120 based on the selected historical journeys 110 (nearest neighbors) because at this point historical journeys are included that have limited spatial correlation with the planned journey 120, i.e. have a relatively large distance to the planned journey 120.

In this context, the distance d between a historical journey 110 and the planned journey 120 is expressed as $d=d(O-O')+d(D-D')$, i.e. the sum of the distance between the origin O of the historical journey 110 and the chosen origin O' of the planned journey 120 and the distance between the destination D of the historical journey 110 and the chosen destination D' of the planned journey 120. In an embodiment, a defined number of nearest neighbors to the planned journey, i.e. a defined number of historical journeys 110 closest or most similar to the planned journey 120, is selected from the database.

In an embodiment, a calibration phase may be performed to estimate the optimal number of nearest neighbors to select from the database for estimating the second journey time as well as to get an estimate for the reliability of the method. This calibration phase involves choosing a candidate k>1 of nearest neighbors to use. Then, for each journey recorded in the database the difference between the actual observed journey time and the average time is calculated by taking the k nearest neighbors of the chosen candidate. This is done by applying the method for estimating a second journey time using the historical database excluding the journey time of the chosen candidate. The journey times of the nearest neighbors of the chosen candidate are accumulated and by averaging the differences over all journeys an average error for the dataset is obtained. This process is repeated by varying k in order to obtain the optimal number k of nearest neighbors at which this average prediction error over the whole set is minimized. The corresponding average error observed gives an estimate of the reliability of the second journey time estimates. In practice, the optimal number of nearest neighbors is likely to lie between 4 and 12.

This average error for instance may also be used at a later stage to define an error threshold for the historical journey time estimation, as will be explained in more detail below.

In a particularly straightforward embodiment, the journey time for the planned journey 120 may be estimated by summing the actual journey times of the selected nearest neighbors and dividing this sum by the number of selected nearest neighbors:

$$T_p = \frac{\sum_{i=1}^{N} T(i)}{N}$$

in which $T_p$ is the estimated journey time for the planned journey 120 and $T(i)$ is the recorded journey time of the $i^{th}$ historical journey 110 in the set of N nearest neighbors to the planned journey 120. It has been found that this simple approximation nevertheless can yield accurate estimates for the journey time $T_p$ because $$L_H = \frac{\sum_{i=1}^{N} L(i)}{N} \approx L_p,$$

in which $L_H$ is the average distance between origins and destinations of the respective selected historical journeys 110, $L(i)$ is the distance between origin and destination of the $i^{th}$ historical journey 110 of the N selected historical journeys and $L_p$ is the distance between the chosen origin and destination of the planned journey 120. In other words, the set of selected historical journeys 110, i.e. the nearest neighbors to planned journey 120 typically comprises shorter and longer journeys compared to the planned journey 120, such that the average distance $L_H$ approximates the distance $L_p$.

It should be understood that other algorithms for estimating the journey time of the proposed journey 120 from the journey times of the selected nearest neighbors in the database may also be contemplated. For instance, for each historical journey time, the journey time may be multiplied by a scaling factor S based on the distance d between a historical journey 110 and the planned journey 120, such that $$T_p = \frac{\sum_{i=1}^{N} S(i) * T(i)}{N},$$

wherein S(i) is the scaling factor for the recorded journey time T(i) of the $i^{th}$ historical journey 110 in the set of N nearest neighbors to the planned journey 120.

In an embodiment, journey time $T_p$ may be estimated by $$T_p = \frac{\sum_{i=1}^{N} W(i) * T(i)}{\sum_{j=1}^{N} W(j)}$$

in which W is a weighting factor of the recorded journey time T of the $i^{th}$ historical journey 110 in the set of N nearest neighbors to the planned journey 120. Such a weighting factor for example may be determined based on a difference between the time of day for the planned journey 120 and the time of day at which the $i^{th}$ historical journey 110 was made. In an embodiment, the weighting factor W may be defined as W(i)=(1/(1+e(i))), wherein e(i) is the difference in seconds between the travel time of the $i^{th}$ historical journey 110 and the planned journey 120. In this manner, historical journeys 110 that were made close to or during the same time of day as the planned journey 120 can be more heavily weighted in the calculation of $T_p$ to reflect the increased likelihood that the historical journey 110 was made under similar traffic conditions as can be expected for the planned journey 120. Selected historical journeys 110 that were made at times of day during which historically different traffic conditions have been experienced, may be weighted less heavily, thereby potentially improving the accuracy of the estimated journey time $T_p$.

Other suitable approaches will be apparent to the skilled person. For example, rather than weighting the recorded journey times of the selected historical journeys 110, the selection of the historical journeys 110 may at least in part be based on a similarity between the time of day of the historical journeys 110 and the time of day of the planned journey 120. This may lead to the selection of a set of nearest neighbors to the planned journey 120 sharing a similarity in the time of travel. It will be understood that in this embodiment, the nearest neighbors are not necessarily nearest in distance to the planned journey 120 but are nearest in terms of a combination of distance and time of travel. Many suitable algorithms factoring in such combinations can be envisioned.

As will be explained in more detail below, in at least some embodiments an error for the estimated journey time $T_p$ should be determined in order to determine the accuracy of the estimated journey time. A number of factors may be used to determine the accuracy of the estimated journey time $T_{pm}$, among which: (1) the average distance between the planned journey 120 and the selected nearest neighbors 110, (2) the ratio between this average distance (3) the total length of the planned journey 120, and (4) the (population) standard deviation (SD) of the N closest historical route travel times (i.e. the travel times of the selected N nearest neighbors), divided by the mean travel time for these historical routes. The value of these indicators are calculated for each historical route, and a decision tree is trained offline using a supervised-learning method (such as a decision tree regressor) to determine the importance of the various aforementioned contributions to the error for the estimated journey time $T_p$. For a typical database comprising a large enough number of historical journeys 110 in a region 100, e.g. hundreds or thousands of historical journeys 110, it was found that the error is dominated by the standard deviation, e.g. the error E, such that in the present application at least the standard deviation is used to calculate the error for the estimated journey time $T_p$.

The error in the journey time $T_p$ may be compared against a defined error threshold to determine if the journey time $T_p$ is accurate enough to be used as an estimated journey time for the planned journey 120. For example, $T_p$ is only used when its error is below a defined threshold. The threshold may be defined in any suitable manner. A particularly suitable manner is to derive the threshold based on a database evaluation in which the best N neighbors to the planned journey 120 are calculated as explained above. The error threshold for instance may be set identical to the observed error in the database as computed in this evaluation, a standard deviation may be added to the observed error, and so on.

Figure 2:
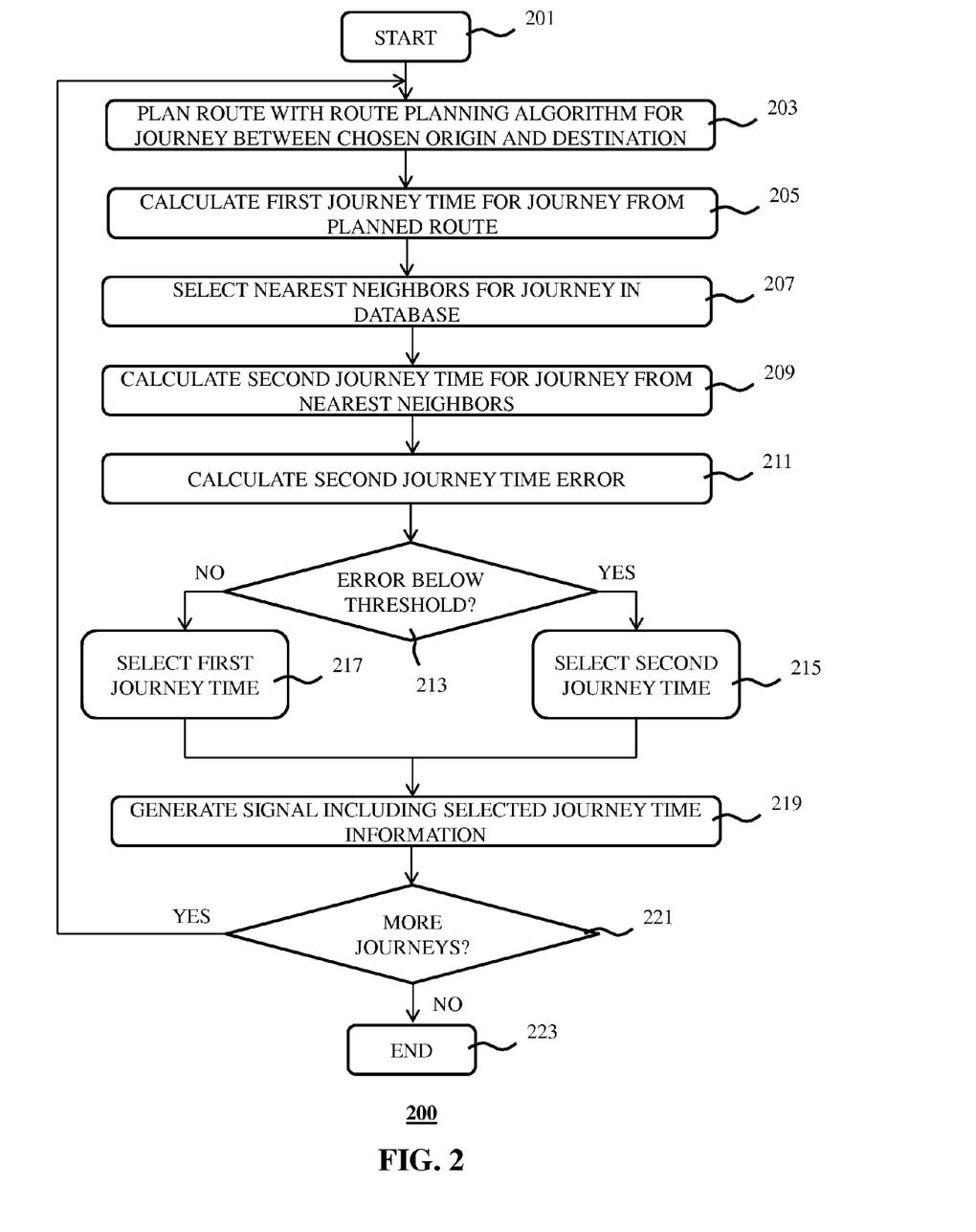
FIG. 2 is a flowchart of a method according to an embodiment.

The above teachings may be used in a computer-implemented method 200 for calculating a journey time for a planned journey 120 between a chosen origin O' and a chosen destination D' over a network of roads in the region 100. A flowchart of the method 200 is shown in FIG. 2. The method starts in 201 with the reception of the chosen origin and destination of the planned journey 120 after which the method proceeds to 203 in which a route is calculated with a conventional route planning algorithm. Such a route planning algorithm may be any suitable route planning algorithm that utilizes predictive journey time calculation based on an accumulation of partial journey times over the road segments of the planned route. For example, the route planning algorithm may include a graph representation of the network of roads including graph edges corresponding to road segments and graph nodes interconnecting graph edges, where each graph edge comprises a set of parameters from which a partial journey time over the road segment can be estimated and where calculating the first journey time for the route comprises calculating the partial journey times for the road segments defining the planned route and summing the calculated partial journey times. Any suitable route planning algorithm may be used, e.g. route planning algorithms using Dijkstra's algorithm.

The parameters from which a partial journey time over the road segment can be estimated may be static parameters, e.g. the length l of the road segment and the maximum speed (ms) on the road segment, such that the partial travel time (pt) over the road segment can be estimated by pt=l/ms. Alternatively, the parameter sets of at least some of the road segments may include real-time parameters, such as actual travel speeds on a road segment as monitored by fixed sensors such as induction loops, cameras, or the like or by mobile sensors, e.g. GPS data sampled from a vehicle travelling over the road segment, or may include historical data, such as historical average speeds over the road segment, e.g. for a given time of day, It should be understood that any known suitable implementation of such a graph-based route planning algorithm may be used.

In 205, a first journey time is calculated for the planned journey 120 from the route planned in 203 based on the summing of partial journey times over the individual road segments as explained above. In an embodiment, the first journey time is calculated by the following formula:

$$T_p(1) = \sum_{i=1}^{M} \left( \alpha * \frac{l(i)}{s(i)} + \beta \right),$$

in which $T_p(1)$ is the first journey time, l(i) is the length of the $i^{th}$ road segment of the planned route containing M road segments, s(i) is the speed over the $i^{th}$ road segment, which may be the maximum speed ms or a real-time or historical speed as explained above, α is a scaling factor to correct s(i). α may be smaller than 1 where s(i) corresponds to the speed limit on the $i^{th}$ road segment as the actual speed on the road segment typically is lower than the speed limit.

In some embodiments, a may be a function of the time of day, such that a priori knowledge about traffic levels on the road segments of the planned route can be factored in. Where s(i) is based on historical or real-time data, α may be 1. In embodiments, a model is chosen in which s(i)=ms(i) and α<1 as it has been found that this can produce more accurate results than models based on historical average speeds over the road segments of the model.

The factor β is an overhead factor estimating the time it takes to start and park the vehicle. The factor β may be location dependent, in particular may be a function of the chosen destination to factor in a priori knowledge of the availability of parking spaces at or near the chosen destination D' of the planned journey 120. The factor β may be location dependent as well as dependent of the time of day to factor in a priori knowledge of the availability of parking spaces at or near the chosen destination D' of the planned journey 120 at the time of day at which the journey 120 is planned. For example, it may be well-known that during business hours parking spaces at or near destination D' are limited, such that the factor β may be larger for a planned journey 120 during business hours compared to a planned journey outside business hours when parking spaces at or near destination D' are readily available.

In 207, the nearest neighbors, i.e. the most relevant historical journeys 110, to the planned journey 110 are selected from the provided database as explained in more detail above and a second journey time is calculated for the planned journey in 209 based on the selected nearest neighbors as explained in more detail above, e.g. by calculating the average journey time for the selected nearest neighbors and assigning this calculated average journey time to the second journey time. The error of the second journey time is calculated in 211 based on at least the standard deviation in the recorded journey times of the selected set of nearest neighbors as previously explained.

Next, it is checked in 213 if the calculated error in the second journey time is small enough, i.e. is below a defined threshold, to determine that the confidence in the second journey time is high enough to use this journey time as the journey time estimate for the planned journey 120. If this is the case, the second journey time is selected in 215, else the first journey time is selected in 219, after which a signal is generated in 221 including the selected journey time, e.g. a signal pertaining information about the selected journey time of the planned journey 120. Such a signal for instance may be transmitted to a remote device, e.g. a device of a client scheduling a journey such as a delivery round in the region 100 using a goods vehicle such as a van or truck, which signal may be processed by the remote device to present the information to the user, e.g. in visual form on a display or the like, in audible form on a loud speaker or the like, and so on.

The method 200 terminates in 223 if no further journeys need planning, as checked in 221. Else, the method 200 reverts back to 203 in which a further journey is planned based on the provided chosen origin and destination of the further journey.

It should be understood that the order of the various stages of the method 200 is given by way of non-limiting example and is not intended to limit the scope of the present invention. For example, it is equally feasible to perform steps 203 and 205 after performing step 217, or perform these steps concurrently.

The computer-implemented method 200 may be advantageously integrated in a travelling salesman algorithm. Such algorithms are well-known and seek to plan a trip that visits all data points of a data set including a chosen origin and a plurality of chosen destinations in which the trip time of the trip is minimized. The trip time is the sum of the individual journey times of the journeys between two data points, e.g. between the chosen origin and a chosen destination or between two chosen destinations, where the chosen destination of a previous journey of the trip becomes the chosen origin of the next journey of the trip. A special instance of such a trip is a round trip, where the trip must start and finish at the chosen origin. Such round trips are particularly common for logistics or haulage companies operating in a region 100, where a typical working day consists of making a plurality of deliveries at a plurality of destinations within the region 100.

Figure 3:
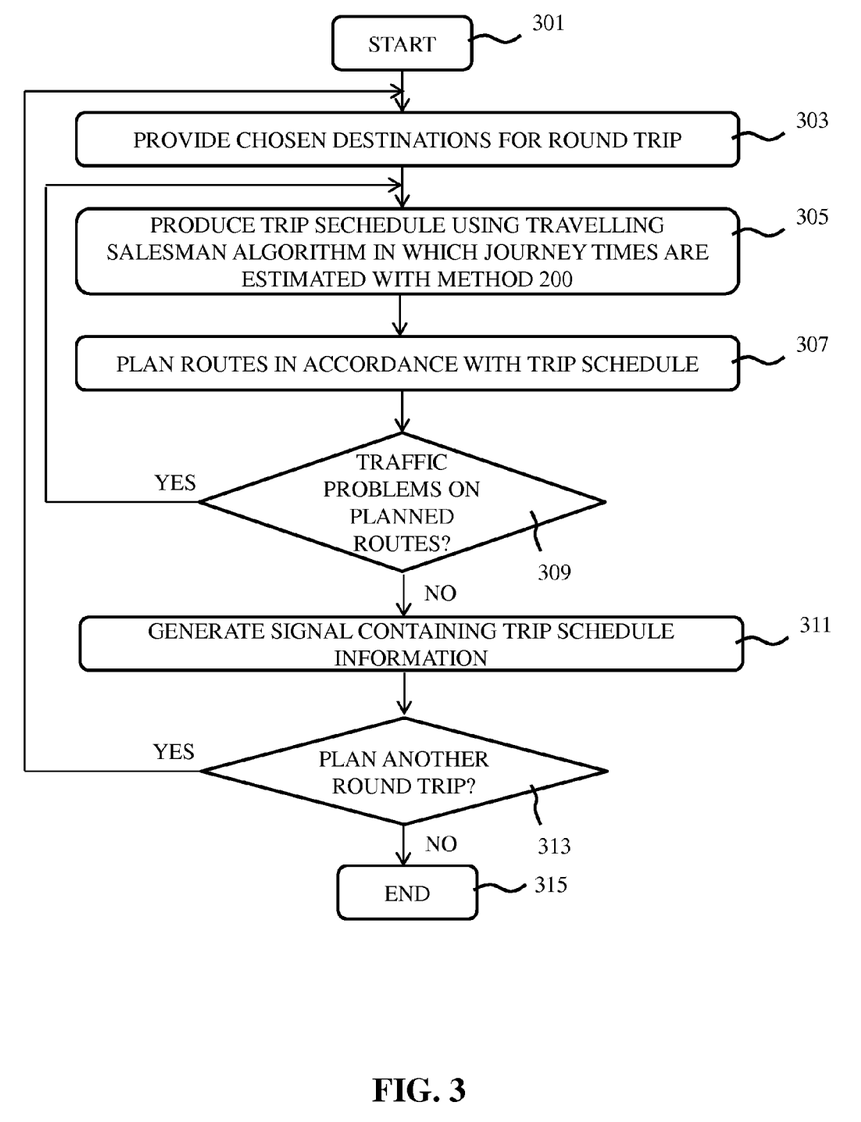
FIG. 3 is a flowchart of a method according to another embodiment.

The travelling salesman algorithm may seek to produce a round trip of minimal distance or of minimal duration, such that the number of destinations (deliveries) that can be visited in a single trip can be maximized. Where the travelling salesman algorithm seeks to produce a round trip of minimal duration, the journeys that combine to form the (round) trip are selected such that their combined estimated journey times are minimized. According to an aspect, a computer-implemented method 300 is provided, a flow chart of which is shown in FIG. 3. The method 300 starts in 301 and proceeds to 303 in which a user provides, e.g. uploads, a set of data points including a chosen origin and a plurality of chosen destinations, which are used in the method 300 to calculate a trip schedule in 305 including the provided data points using a travelling salesman algorithm in which the individual journey times of the journeys that combine to form the round trip are calculated using an embodiment of computer-implemented method 200.

The method 300 may optionally proceed to step 307 in which routes for the selected individual journeys are calculated, e.g. using the route planning algorithm used in step 203 of computer-implemented method 200. The planned routes may be checked in 309 for reported traffic problems, e.g. reported road works, traffic accidents, congestion or the like. If no such problems are found the method 300 proceeds to 311 in which a signal is generated containing the round trip schedule information. As before, such a signal for instance may be transmitted to a remote device, e.g. a device of a client scheduling a round trip such as a delivery round in the region 100 using a goods vehicle such as a van or truck, which signal may be processed by the remote device to present the information to the user, e.g. in visual form on a display or the like, in audible form on a loudspeaker or the like, and so on. The checking 309 for reported traffic problems may be performed prior to releasing the round trip schedule to the client or during travel on the round trip such that encountering real-time traffic problems can be avoided for chosen destinations of the round trip that have not yet been visited, e.g. by rescheduling part of the round trip to avoid the traffic problems.

If traffic problems are detected in 309 for some of the scheduled routes, the method 300 reverts back to 305 in which a new schedule is produced where the journey between the two data points for which the affected route was calculated in 307 is excluded from the allowable solution to the travelling salesman problem. This is repeated until around trip schedule is produced in which none of the planned routes encounter traffic problems.

After generation of the signal containing the round trip schedule information it is checked in 313 if another round trip needs scheduling. If this is the case the method 300 reverts back to 303, else the method 300 terminates in 315.

The accuracy of the computer-implemented method 300 against a round trip scheduling method utilizing a travelling salesman algorithm in which the round trips were compiled by selecting the individual journeys or legs of the round trips based on estimated journey times using a conventional route planning algorithm only, i.e. by calculating the estimated journey times using a road segment-based approach in which the estimated journey time is generated by summing the partial journey times of each road segment in a planned route for a journey of the round trip as previously explained. This verification was performed on roundtrips in an urban area in France using a filtered database comprising around 4,000 historical journeys. Using the static model only, 46% of individual journeys had predicted journey times with an error greater than 20% and 18% of round trips with an error greater than 20% in the predicted trip time. Using the methods embodiments of the present invention, 43% of individual journeys had predicted journey times with an error greater than 20% and 13% of round trips with an error greater than 20% in the predicted trip time. Once embodiments described herein were utilized as input to plan delivery rounds with correct time estimates, this corresponded to an improvement (reduction) of 18% in distance covered and 12% in overall time of the round trips. The methods of embodiments of the present invention therefore facilitate a reduction on total urban traffic by several percentage points, which equates as well to a significant reduction in greenhouse gases (e.g. $CO_2$) in such urban areas.

Figure 4:
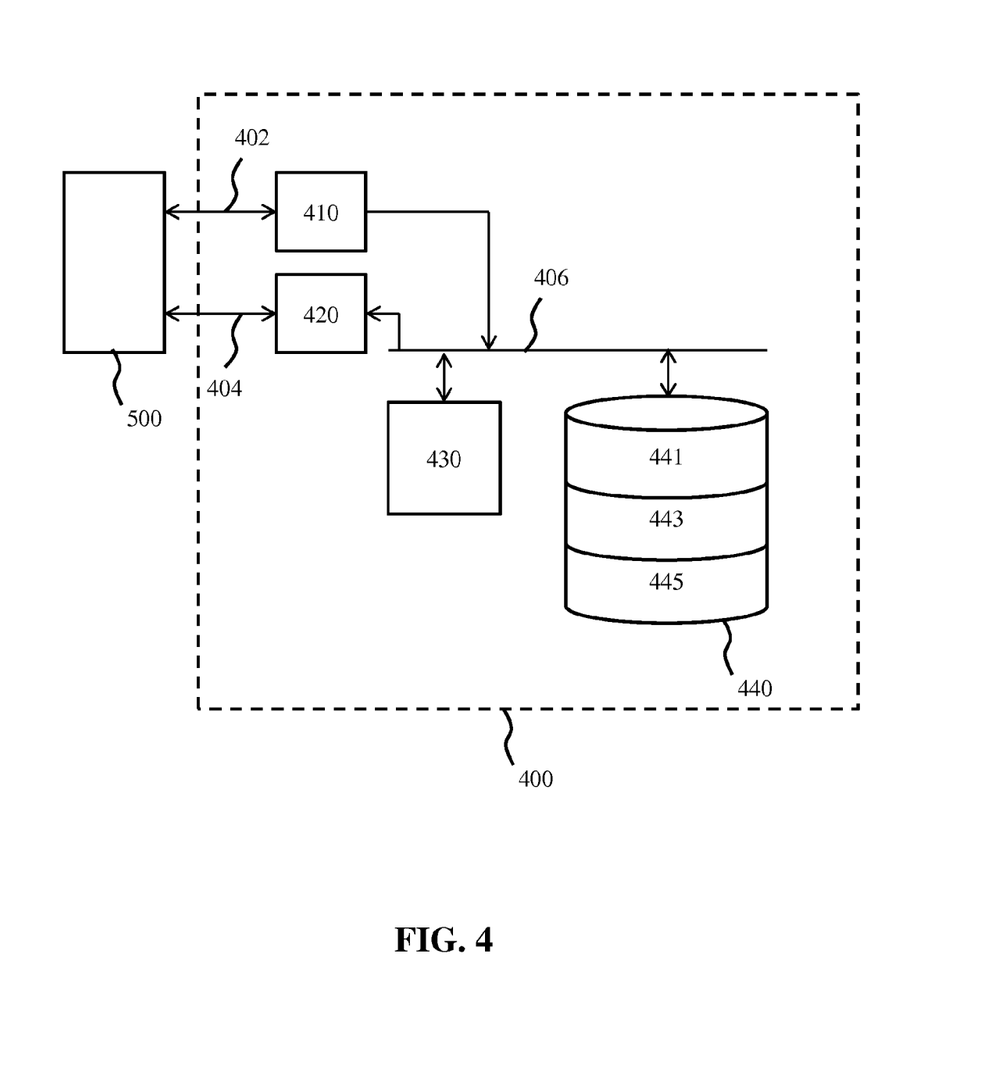
FIG. 4 schematically depicts a computer system according to an embodiment.

FIG. 4 schematically depicts a computer system 400 for calculating a journey time for a planned journey 120 between a chosen origin O' and a chosen destination D' over a network of roads in the region 100 that is adapted to implement the computer-implemented method 200 and/or the computer-implemented method 300. The computer system 400 typically comprises an input device adapted to receive data identifying the chosen origin and the chosen destination(s) from an external device 500 over a communications link 402. Any suitable external device 500 may be used for this purpose, e.g. a desktop computer, satellite navigation device, a portable computing device including but not being limited to a laptop computer, a tablet, a personal digital assistant, a smart phone, and so on.

In an embodiment, the external device 500 comprises a processor and a data storage device storing a software application for communicating with the computer system 400, e.g. to provide the chosen origin and destination(s) to the computer system 400, where the processor is adapted to execute the software application. The software application in some embodiments may be a web browser, in which case the input device 410 may be a web server hosting a webpage accessible by the web browser in which a user of the external device 500 can input the chosen origin and destination(s), e.g. manually or by uploading a file having a defined format that includes the chosen origin and destination(s). The external device 500 may communicate with the input device 410 in any suitable manner using any suitable indication protocol over the communications link 402, e.g. a wireless communication protocol over a wireless communications link 402, e.g. a satellite link or a mobile telephony network, or a wired communication protocol over a wired communications link 402 such as the Internet or a secure P2P network connection such as a virtual LAN connection. Other suitable embodiments of the input device 410 will be apparent, e.g. a network interface, modem or the like for receiving the data from the external device 500.

The computer system 400 may further comprise an output device 420 for providing the signal comprising the selected journey time for the planned journey 120 to the external device 500 over a further communications link 404, which may be the same or different to the communications link 402. Similarly, the output device 420 may be the same or different to the input device 410. For example, the computer system 400 may comprise a data communication module including the input device 410 and the output device 420. Suitable examples of such a data communication interface include a network interface, a modem or the like. In a particularly suitable embodiment, the data communication interface comprises a web server hosting a webpage adapted to receive the journey details of the planned journey 120 as explained above and to display the estimate of the journey time and/or round trip schedule in response to the signal generated by the processor arrangement 430 of the computer system 400.

The processor arrangement 430 may comprise one or more processors adapted to execute the program instructions detailed below. Any suitable type of processor may be used for the processor arrangement 430, e.g. generic processors such as single-core or multi-core processors or application-specific integrated circuits.

The computer system 400 further includes a data storage arrangement 450 including a first data storage volume 441 storing computer readable program instructions implementing a route planning algorithm including a graph representation of the network of roads including graph edges corresponding to road segments and graph nodes interconnecting graph edges, where each graph edge comprises a set of parameters from which a partial journey time over the road segment can be estimated as previously explained, a second data storage volume 443 storing a database of entries of historical journeys in the region, each journey entry in the database comprising a journey origin, a journey destination and an actual journey time to obtain a second journey time for the journey as previously explained and optionally includes a third data storage volume 445 storing computer readable program instructions for executing a travelling salesman algorithm to a set of data points including the origin and the plurality of chosen destinations as previously explained.

The data storage arrangement 450 may take any suitable form; for example, the first data storage volume 441, the second data storage volume 443 and the optional third data storage volume 445 may embody different volumes of a single data storage device or may embody volumes located on different data storage devices of the data storage arrangement 450. For example, the data storage arrangement 450 may comprise a plurality of data storage devices, which may be organized in any suitable manner, for example a storage area network or a network attached storage, or a plurality of data storage devices integrated in the computer system 400. Any suitable type of data storage device may be contemplated such as for example but not limited to solid state data storage devices, magnetic data storage devices, optical data storage devices, and so on. Where the data storage arrangement 450 comprises a plurality of data storage devices, such data storage devices may be located in a single location, e.g. within a single housing, or may be distributed over multiple locations.

The processor arrangement 430 may be communicatively coupled to the input device 410, the output device 420 and the data storage arrangement 440 in any suitable manner, for instance by dedicated P2P connections or by a shared data connection 406 such as a bus architecture or the like. Such interconnection structures within computer systems are well-known per se and are therefore not explained in further detail for the sake of brevity only. It suffices to state that any suitable interconnection structure may be used to communicatively coupled to the processor arrangement 430 to the input device 410, the output device 420 and the data storage arrangement 440.

In order to implement the method 200, the processor arrangement 430 is typically adapted to plan a route for the planned journey 120 as received via the input device 410 by executing the route planning algorithm in first data storage volume 441, the planning comprising calculating a first journey time for the route; select a set of historical journeys from the database, where the selected historical journeys have a historical origin and a historical destination that are nearest neighbors to the chosen origin and the chosen destination of the journey; calculate a second journey time for the journey from the selected set of historical journeys in the database in second data storage volume 443; estimate an error for the second journey time based on calculating a standard deviation for calculated journey times of the historical journeys in the set, where the journey time of each of the historical journeys in the set is calculated from the actual journey times of the other historical journeys in the set; select the second journey time for the journey if the estimated error is below a defined threshold, else selecting the first journey time; and generate a signal comprising the selected journey time for the journey on the output device 420. To this end, the computer system 400 may include computer-readable program instructions for execution on the processor arrangement 430 that cause the processor arrangement 430 to perform these actions. The computer-readable program instructions may be stored on any computer-readable storage medium, such as the data storage arrangement 450 or a remote data storage arrangement accessible through a data communications interface of the computer system 400, e.g. a data communications interface including the input device 410 and/or the output device 420.

In order to implement the method 300, the processor arrangement 430 may be further adapted to schedule a round trip from an origin via a plurality of chosen destinations received through the input device 410 over a network of roads in the region 100 by executing the travelling salesman algorithm stored in third data storage volume 443 using the set of data points received through the input device 410 to generate a round trip from the chosen origin including the chosen destinations, the travelling salesman algorithm minimizing the journey time for the round trip by calculating the first journey time and the second journey time for each leg of the round trip and selecting the second journey time for the leg if the estimated error of the second journey time is below a defined threshold, else selecting the first journey time for the leg; and generating a signal comprising the scheduled round trip on the output device 420, e.g. to control the generation of a visual or audible representation of the scheduled round trip on the external device 500. To this end, the computer system 400 may include further computer-readable program instructions for execution on the processor arrangement 430 that cause the processor arrangement 430 to perform these actions of the method 300. The further computer-readable program instructions may be stored on any computer-readable storage medium, such as the data storage arrangement 450 or a remote data storage arrangement accessible through a data communications interface of the computer system 400, e.g. a data communications interface including the input device 410 and/or the output device 420.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method of calculating a journey time for a journey between a chosen origin and a chosen destination over a network of roads in a region including the chosen origin and chosen destination,
the method comprising:
  planning, by a journey time estimation service executing on a processor,
  a route for the journey using a route planning algorithm,
  the planning comprising calculating a first journey time for the route based at least in part on data from fixed sensors,
  the chosen origin and the chosen destination received via a client device;
  providing a database of entries of historical journeys in the region,
  each journey entry in the database comprising, for a previously completed journey in the region, a journey origin, a journey destination and an actual journey time;
  selecting a set of historical journeys from the database, where the selected historical journeys have a journey origin and a journey destination that are nearest neighbors to the chosen origin and the chosen destination of the journey;
  calculating a second journey time for the journey based on the selected set of historical journeys;
  estimating an error for the second journey time based on calculating a standard deviation for calculated journey times of the historical journeys in the set, where the journey time of each of the historical journeys in the set is calculated from the actual journey times of the other historical journeys in the set;
  selecting the second journey time for the journey if the estimated error is below a defined threshold, else selecting the first journey time; and
  outputting the selected journey time for the journey to the client device, wherein each database entry further comprises an actual time of day when the historical journey was made, and where calculating the standard deviation for calculated journey times of the historical journeys in the set comprises providing an estimated time of day for the journey and weighting the selected historical journeys in the calculation in accordance with a difference between the estimated time of day for the journey and the actual journey time of the selected historical journey.

2. The computer-implemented method of claim 1, wherein each journey origin and journey destination is represented by a pair of geographic coordinates.

3. The computer-implemented method of claim 2, wherein the database comprises a 4-dimensional tree structure, each dimension corresponding to one of the geographic coordinates, and where selecting a set of historical journeys from the database comprises finding a set of nearest neighbors to the planned journey in the tree structure.

4. The computer-implemented method of claim 1, wherein selecting a set of historical journeys from the database comprises selecting a predefined number of nearest neighbors to the planned journey from the database.

5. The computer-implemented method of claim 1, wherein calculating the second journey time for the journey from the selected set of historical journeys comprises calculating the average of the actual journey times of the selected nearest neighbors.

6. The computer-implemented method of claim 1, wherein estimating an error for the second journey time based on calculating a standard deviation for calculated journey times of the historical journeys in the set comprises dividing the calculated standard deviation by a mean journey time for the historical journeys in the set.

7. The computer-implemented method of claim 1, wherein the database is categorized in one or more categories corresponding to vehicle types having made the historical journeys, and where selecting a set of historical journeys from the database comprises selecting historical journeys from a category corresponding to a particular vehicle type.

8. The computer-implemented method of claim 1, further comprising:
  receiving journey information of a journey made in the region, the journey information comprising a journey origin, a journey destination and an actual journey time; and
  updating the database with the received journey information.

9. The computer-implemented method of claim 1, further comprising filtering the database by:
  calculating a possible route for a historical journey;
  calculating an average speed over the possible route based on the actual journey time; and removing historical journeys from the database that have a calculated average speed outside a defined average speed range.

10. The computer-implemented method of claim 1, wherein the route planning algorithm includes a graph representation of the network of roads including graph edges corresponding to road segments and graph nodes interconnecting graph edges, where each graph edge comprises a set of parameters from which a partial journey time over the road segment can be estimated and where calculating the first journey time for the route comprises calculating the partial journey times for the road segments defining the planned route and summing the calculated partial journey times.

11. A computer program product for calculating a journey time for a journey between a chosen origin and a chosen destination over a network of roads in a region, the computer program product comprising a non-transitory computer readable storage medium having program code embodied therewith, the program code executable by a processor to:
plan, by a journey time estimation service, a route for the journey using a route planning algorithm,
the planning comprising calculating a first journey time for the route based at least in part on data from fixed sensors,
the chosen origin and the chosen destination received via a client device;
select a set of historical journeys from a database of entries of historical journeys in the region,
each journey entry in the database comprising, for a previously completed journey in the region, a journey origin, a journey destination and an actual journey time, where the selected historical journeys have a journey origin and a journey destination that are nearest neighbors to the chosen origin and the chosen destination of the journey;
calculate a second journey time for the journey based on the selected set of historical journeys;
estimate an error for the second journey time based on calculating a standard deviation for calculated journey times of the historical journeys in the set, where the journey time of each of the historical journeys in the set is calculated from the actual journey times of the other historical journeys in the set;
select the second journey time for the journey if the estimated error is below a defined threshold, else selecting the first journey time; and
output the selected journey time for the journey to the client device, wherein each database entry further comprises an actual time of day when the historical journey was made, and where calculating the standard deviation for calculated journey times of the historical journeys in the set comprises providing an estimated time of day for the journey and weighting the selected historical journeys in the calculation in accordance with a difference between the estimated time of day for the journey and the actual journey time of the selected historical journey.

12. The computer program product of claim 11, wherein each journey origin and a journey destination is represented by a pair of geographic coordinates.

13. The computer program product of claim 12, wherein the database comprises a 4-dimensional tree structure, each dimension corresponding to one of the geographic coordinates, and where selecting a set of historical journeys from the database comprises finding a set of nearest neighbors to the planned journey in the tree structure.

14. The computer program product of claim 11, wherein selecting a set of historical journeys from the database comprises selecting a predefined number of nearest neighbors to the planned journey from the database.

15. The computer program product of claim 11, wherein the program code is further executable by the processor to:
schedule a round trip from an origin via a plurality of chosen destinations over a network of roads in a region including the origin and the chosen destinations by:
applying a travelling salesman algorithm to a set of data points including the origin and the plurality of chosen destinations.

16. A computer system for calculating a journey time for a journey between a chosen origin and a chosen destination over a network of roads in a region including the chosen origin and chosen destination, the computer system comprising:
a memory having computer readable instructions; and a processor for executing the computer readable instructions, the computer readable instructions including:
planning, by a journey time estimation service, a route for the journey using a route planning algorithm, the planning comprising calculating a first journey time for the route based at least in part on data from fixed sensors, the chosen origin and the chosen destination received via a client device;
providing a database of entries of historical journeys in the region, each journey entry in the database comprising, for a previously completed journey in the region, a journey origin, a journey destination and an actual journey time;
selecting a set of historical journeys from the database, where the selected historical journeys have a journey origin and a journey destination that are nearest neighbors to the chosen origin and the chosen destination of the journey;
calculating a second journey time for the journey based on the selected set of historical journeys;
estimating an error for the second journey time based on calculating a standard deviation for calculated journey times of the historical journeys in the set, where the journey time of each of the historical journeys in the set is calculated from the actual journey times of the other historical journeys in the set;
selecting the second journey time for the journey if the estimated error is below a defined threshold, else selecting the first journey time; and
outputting the selected journey time for the journey to the client device, wherein each database entry further comprises an actual time of day when the historical journey was made, and where calculating the standard deviation for calculated journey times of the historical journeys in the set comprises providing an estimated time of day for the journey and weighting the selected historical journeys in the calculation in accordance with a difference between the estimated time of day for the journey and the actual journey time of the selected historical journey.

17. The computer system of claim 16, wherein each journey origin and a journey destination is represented by a pair of geographic coordinates.

18. The computer system of claim 17, wherein the database comprises a 4-dimensional tree structure, each dimension corresponding to one of the geographic coordinates, and where selecting a set of historical journeys from the database comprises finding a set of nearest neighbors to the planned journey in the tree structure.

19. The computer system of claim 16, wherein selecting a set of historical journeys from the database comprises selecting a predefined number of nearest neighbors to the planned journey from the database.

* * * * *